United States Patent
Schwenger et al.

(10) Patent No.: US 11,679,308 B2
(45) Date of Patent: Jun. 20, 2023

(54) BALL GAME RACKET FRAME

(71) Applicant: Head Technology GmbH, Kennelbach (AT)

(72) Inventors: Ralf Schwenger, Weiler-Simmerberg (DE); Stefan Mohr, Dornbirn (AT)

(73) Assignee: HEAD TECHNOLOGY GMBH, Kennelbach (AT)

( * ) Notice: Subject to any disclaimer, the term of this patent is extended or adjusted under 35 U.S.C. 154(b) by 216 days.

(21) Appl. No.: 16/899,683

(22) Filed: Jun. 12, 2020

(65) Prior Publication Data

US 2021/0187364 A1    Jun. 24, 2021

(30) Foreign Application Priority Data

Dec. 18, 2019   (DE) .......................... 202019005160.0

(51) Int. Cl.
*A63B 49/10*        (2015.01)

(52) U.S. Cl.
CPC ........ *A63B 49/10* (2013.01); *A63B 2209/026* (2013.01)

(58) Field of Classification Search
CPC .............. A63B 49/10; A63B 2209/026; A63B 2209/00; A63B 2209/02; A63B 2209/023
See application file for complete search history.

(56) References Cited

U.S. PATENT DOCUMENTS

| | | | | |
|---|---|---|---|---|
| 4,581,275 A | * | 4/1986 | Endo | B29C 65/02 428/113 |
| 2005/0119075 A1 | * | 6/2005 | Ashino | A63B 49/10 473/535 |
| 2007/0270237 A1 | * | 11/2007 | Tavares | A63B 53/047 473/316 |
| 2009/0191989 A1 | * | 7/2009 | Lammer | A42B 3/063 473/549 |
| 2011/0312451 A1 | * | 12/2011 | Schwenger | A63B 60/00 473/535 |
| 2015/0290900 A1 | * | 10/2015 | Tsunashima | A63B 49/10 428/36.1 |
| 2015/0352410 A1 | * | 12/2015 | Janes | A63B 49/00 473/521 |
| 2021/0187364 A1 | * | 6/2021 | Schwenger | B29C 70/16 |

FOREIGN PATENT DOCUMENTS

| | | | | |
|---|---|---|---|---|
| DE | 202019005160 U1 | * | 5/2020 | ............ A63B 49/10 |
| EP | 0050854 A1 | * | 5/1982 | ............ B29C 70/24 |
| EP | 2336018 A1 | * | 6/2011 | ............ B29C 70/24 |
| JP | S61150891 U | * | 9/1986 | ............ A63B 49/10 |
| JP | S6366362 A | * | 3/1988 | ............ A01K 87/00 |
| JP | H06238014 A | * | 8/1994 | |
| JP | H07223272 A | * | 8/1995 | |
| JP | 2009084774 A | * | 4/2009 | |
| JP | 4576591 B2 | * | 11/2010 | |
| JP | 4601216 B2 | * | 12/2010 | |
| KR | 100791109 B1 | * | 1/2008 | |
| WO | WO-2017007977 A1 | * | 1/2017 | ............ A01K 87/00 |

* cited by examiner

*Primary Examiner* — Raleigh W Chiu
(74) *Attorney, Agent, or Firm* — Bookoff McAndrews, PLLC

(57) ABSTRACT

The present invention relates to a ball game racket frame with a head portion and a handle portion, wherein the ball game racket frame comprises a fiber composite with at least one multi-fiber roving that is at least partially twisted.

20 Claims, 1 Drawing Sheet

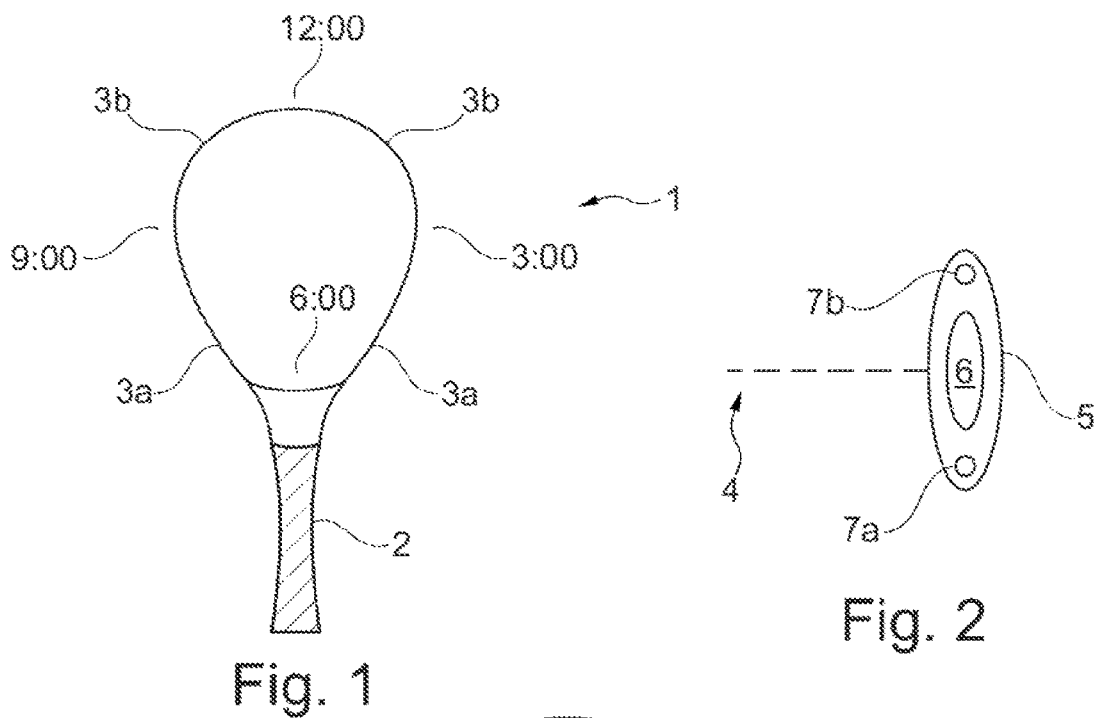
Fig. 1
Fig. 2
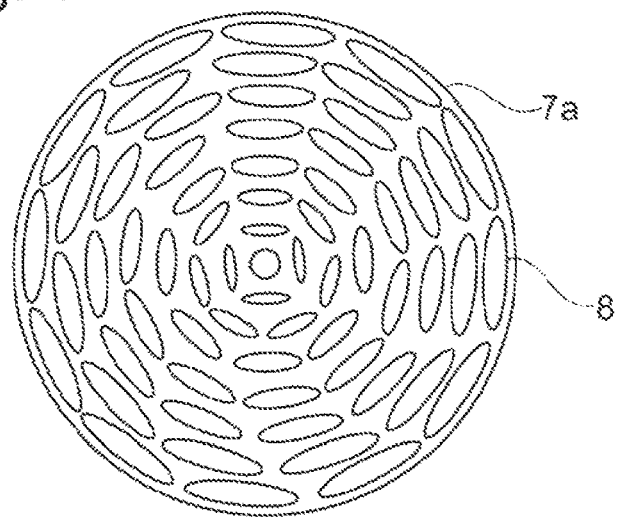
Fig. 3
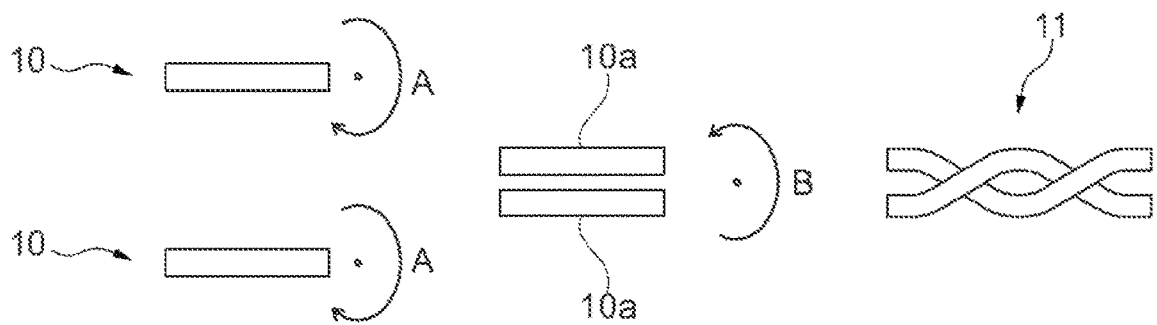
Fig. 4

BALL GAME RACKET FRAME

This patent application claims the benefit under 35 U.S.C. 119 to German Utility Model Application No. DE 20 2019 005 160.0, filed on Dec. 18, 2019, the entirety of which is incorporated herein by reference.

The present invention relates to an improved ball game racket frame with at least one multi-fiber roving as well as to a ball game racket with such a frame.

Ball game racket frames have long been produced from, inter alia, carbon fiber composites (or from composite materials with other fibers) as these composite materials have outstanding properties, and ball game racket frames may be produced in a relatively simple manner with the help of these composite materials, wherein the desired playing characteristics of the ball game racket produced in this way may purposefully be adjusted by means of corresponding material and process parameters. As a rule, so-called "prepreg layers", which are made of fibers (e.g., carbon fibers) embedded in a resin, are inserted into a tubular blow mold with appropriate alignment for this purpose. The tube made of prepreg layers and produced in this way is inflated within the mold by means of pressurized air, and cured within the mold at appropriate temperatures.

In this context, said prepreg layers may also comprise so-called multi-fiber rovings. A multi-fiber roving is a bundle, strand, or multifilament yarn of filaments or fibers arranged in parallel and made of carbon or other materials such as glass or aramid. To date, such rovings have been used in specific sections of the ball game racket frame in order to impart maximum stiffness to these sections.

Despite the long history of such fiber composite frames, further improvement of the playing characteristics of ball game racket frames has still been worked on. Surprisingly, it has now turned out that not only stiffness may be improved systematically with the help of multi-fiber rovings, but that another form of resilience of the ball game racket frame, which creates a particularly comfortable, softened playing feel, may be achieved using twisted rovings.

Accordingly, the present invention is directed to a ball game racket frame with a head portion and a handle portion, wherein the ball game racket frame comprises a fiber composite with at least one multi-fiber roving that is at least partially twisted. Such twisted multi-fiber ravings have not been used in ball game racket frames so far. It is assumed that the above-mentioned softened playing feel is achieved, inter alia, due to the fact that not only "material stretching" is present in sections of ball game racket frames having a twisted multi-fiber roving but also "technical elongation" takes place since twisting caused by partial untwisting of a roving creates a different kind of resilience.

In the context of the present invention, a multi-fiber roving is understood to be a bundle or strand with at least 3,000, preferably at least 10,000, more preferably at least 15,000 fibers. The individual fibers preferably have a diameter of between 3 µm and 50 µm, more preferably of between 4 µm and 20 µm, and particularly preferably of between 5 µm and 10 µm. In the context of the present invention, a twisted multi-fiber roving is understood to be a multi-fiber roving whose ratio of the number of complete twists (with an outer fiber of the roving forming a complete helix of 360°) of the twisted multi-fiber roving is at least 10 m$^{-1}$ per length of the multi-fiber roving. For a multi-fiber roving that is at least partially twisted, this ratio is to apply in at least one section of the multi-fiber roving. The length of the twisted section of the multi-fiber roving (or the complete, twisted multi-fiber roving) is preferably at least 1 cm, more preferably at least 2 cm, and particularly preferably at least 3 cm.

Preferably, the multi-fiber roving comprises one or a combination of the following fibers: carbon fibers, glass fibers, aramid fibers such as Kevlar or Technora, basalt fibers, fibers of highly stretched polymers such as polyethylene or polypropylene, steel fibers.

The frame preferably comprises a frame portion in which it is applicable for every cross section through the frame portion perpendicular to its contour line that the share by area of the multi-fiber roving in the total area of the fiber composite in this cross section is at least 1%, preferably at least 3%, and particularly preferably at least 5%.

The frame preferably comprises a frame portion in which it is applicable for every cross section through the frame portion perpendicular to its contour line that the share by number of the twisted fibers of the multi-fiber roving in the total number of fibers of the fiber composite in this cross section is at least 1%, preferably at least 3%, and particularly preferably at least 5%.

The number of complete twists n (with an outer fiber of the multi-fiber roving forming a complete helix of 360°) of the twisted multi-fiber roving per length l of the multi-fiber roving defines a ratio n/l. Preferably, the ratio n/l is at least 0.2 cm$^{-1}$, more preferably at least 0.4 cm$^{-1}$, and particularly preferably at least 0.6 cm$^{-1}$.

The twisted multi-fiber roving comprises preferably 3,000 to 100,000 fibers, more preferably 5,000 to 50,000 fibers, and particularly preferably 15,000 to 25,000 fibers.

In this context, the twisted multi-fiber roving is preferably embedded in a cured resin. Suitable resins are, for instance, thermosetting resins such as, e.g., epoxy resins, vinyl ester resins, polyester resins. Alternatively, thermoplastic matrix materials such as, e.g., polyamide or PMMA may also be used.

Preferably, only one or a plurality of frame portions of the ball game racket frame is/are formed from the fiber composite with the twisted multi-fiber roving, wherein the remaining ball game racket frame is preferably formed from a fiber composite without twisted multi-fiber rovings. The frame portion(s) with the twisted multi-fiber roving is/are preferably arranged in one or a plurality of the following areas at the head portion: between 4.30 o'clock and 5.30 o'clock, between 6.30 o'clock and 7.30 o'clock, between 10.30 o'clock and 11.30 o'clock, between 12.30 o'clock and 1.30 o'clock. In this context, these times marking the areas are defined such that 6.00 o'clock points towards the handle portion of the ball game racket and 12.00 o'clock is arranged at the end of the head portion opposite the handle portion.

The twisted multi-fiber roving in the head portion is preferably arranged such that in a cross section through the frame portion it runs perpendicular to its contour line above and/or below the stringing plane, preferably in an area with maximum distance to the stringing plane.

The present invention is further directed to a ball game racket, particularly to a tennis racket, squash racket, badminton racket, or racquetball racket, with a ball game racket frame as described above.

Further, the present invention relates to a method for producing a ball game racket frame, particularly a ball game racket frame as described above. Thus, at first a plurality of prepreg layers with pre-impregnated fibers are provided, wherein at least one of the prepreg layers comprises a multi-fiber roving that is at least partially twisted. A tube of said prepreg layers is then inserted into a racket mold and subsequently cured within the racket mold using pressure and heat. In doing so, the pressure typically lies within a range of between 5 and 15 bars, preferably of between 8 and 12 bars. The temperature used is typically at between 120 and 200° C., preferably at between 150 and 170° C.

In this context, the at least one prepreg layer that comprises a twisted multi-fiber roving may be provided in different ways. According to a first alternative, a fiber bundle with a plurality of fibers that are arranged substantially parallel in the first place is provided, which fiber bundle is subsequently twisted. The twisted fiber bundle is then inserted into a prepreg layer or converted to a prepreg layer by impregnating it with a resin.

As an alternative, as a first step a fiber bundle with a plurality of fibers that are arranged substantially parallel in the first place is inserted into a prepreg layer (or converted to a prepreg layer by impregnating it with a resin) which is subsequently twisted as a whole (inclusive of the fiber bundle). In the second alternative, at least two prepreg layers too may be twisted around a first rotational direction, and the at least two twisted prepreg layers may then in turn be twisted together, wherein the step of twisting together preferably takes place around a second, opposite rotational direction. In this context, the number of twists n of the two twisted prepreg layers per length l of the layer defines a first ratio n/l, and the number of twists m of the prepreg layers with each other per length l of the layers defines a second ratio m/l. Preferably, the first ratio n/l is at least $0.2 \text{ cm}^{-1}$, preferably at least $0.4 \text{ cm}^{-1}$, and particularly preferably at least $0.6 \text{ cm}^{-1}$. The second ratio m/l is preferably smaller than the first ratio n/l. Furthermore, the second ratio m/l is preferably at least $0.1 \text{ cm}^{-1}$, preferably at least $0.3 \text{ cm}^{-1}$, and particularly preferably at least $0.5 \text{ cm}^{-1}$.

The at least one prepreg layer defines a first longitudinal axis, and the alignment of the multi-fiber roving defines a second longitudinal axis. Preferably, the first longitudinal axis and the second longitudinal axis enclose an angle $\alpha$ that lies within a range of between 5° and 85°, more preferably of between 10° and 60°, and particularly preferably of between 20° and 40°.

In the following, preferred embodiments of the present invention are described in more detail with respect to the figures, wherein FIG. 1 schematically shows a top view of a ball game racket frame;

FIG. 2 shows a cross section through the frame portion perpendicular to its contour line;

FIG. 3 shows a schematic view of a cross section through a twisted multi-fiber roving; and FIG. 4 schematically shows potential twisting steps.

FIG. 1 schematically shows a ball game racket frame with a head portion 1 and a handle portion 2. With the help of this illustration, it is to be clarified how the times 3.00 o'clock, 6.00 o'clock, 9.00 o'clock and 12.00 o'clock are to be understood within the context of the present invention. Further, preferred frame portions with the twisted multi-fiber roving have been marked with reference signs 3a (between 4.30 o'clock and 5.30 o'clock as well as between 6.30 o'clock and 7.30 o'clock) and 3b (between 10.30 o'clock and 11.30 o'clock as well as between 12.30 o'clock and 1.30 o'clock).

FIG. 2 shows a cross section through the frame portion according to the invention perpendicular to its contour line at position 3a according to FIG. 1, wherein reference sign 4 is to indicate the course of the stringing plane schematically. In its cross section, the frame portion 5 comprises a hollow profile with a cavity 6. Furthermore, a multi-fiber roving 7b and 7a is provided above and below the stringing plane, respectively, which multi-fiber rovings comprise all but maximum distance to the stringing plane 4.

FIG. 3 schematically illustrates an enlarged cross section through the multi-fiber roving 7a with individual fibers 8. As can be seen, a twisted multi-fiber roving is characterized by the individual fibers 8 forming helices. In a cross section perpendicular to the contour line of the ball game racket frame it shows that the individual fibers comprise an increasingly elongated cross section wherever the distance from the center of the multi-fiber roving increases.

As a result, it can be determined by means of analyzing cross sections of a ball game racket frame whether such a ball game racket frame comprises twisted multi-fiber rovings, how strongly they are twisted, if so, and how many fibers such a multi-fiber roving comprises.

First of all, a cross-sectional slice is cut out from the ball game racket frame for this purpose, and its surface is polished. The polished surface of the cross section is then captured using a microscope, e.g., at a magnification of 400 to 3,000. With the help of appropriate image processing software, the optical parameters (contrast, threshold, etc.) are subsequently optimized such that the individual fibers within the cross section may be identified and measured automatically. With appropriate image processing software being used, the corresponding parameters of the individual fibers, e.g., the cross-sectional area, length-to-width ratio, alignment, number of fibers per roving, etc., may then be determined automatically and analyzed statistically.

In this way, the areas with a twisted multi-fiber roving may be distinguished from regular, i.e. parallel, fiber bundles without doubt. Moreover, an appropriate analysis of a plurality of adjacent cross sections of a ball game racket frame allows for the course of individual fibers to be traced from cross section to cross section, thus making it possible to determine how many twists of the twisted multi-fiber roving are present per length.

As already explained at the beginning, fiber bundles with fibers being arranged in parallel may be twisted, and such a twisted fiber bundle may then be embedded in a prepreg layer. Alternatively, a prepreg layer may be twisted together with a fiber bundle too. Since such a twisted prepreg layer may possibly untwist again in the course of the further production process, it is preferred in this alternative of production that, e.g., two prepreg layers 10 at a time are twisted with one multi-fiber roving around a first rotational direction A (cf. the schematic illustration in FIG. 4). Subsequently, the two prepreg layers 10a already being twisted are twisted together around a second, opposite rotational direction B. For this purpose, both ends of the two prepreg layers 10 may, e.g., be mounted in a machine having three rotating heads such that both first ends of the prepreg layers are collectively fixed on a first one of said heads, and that each of the two second ends of the two prepreg layers is fixed on a second or third rotating head, respectively. The second and third heads are then both rotated around a first rotational direction A, wherein the first head keeps still. Afterwards, the first head is rotated around a second rotational direction B, wherein the second and third heads keep still.

The bundle 11 of prepreg layers produced in this way is relatively resilient due to the counter-rotational directions and will generally not disentangle by itself. As needed, sections may then be cut from such a bundle 11 and used in the further production process.

A preferable basic raw material is a prepreg strip of 10 mm in width, 0.07 mm in thickness and 100 cm in length with a density of 75 g/m$^2$ and just under 20,000 fibers being arranged substantially in parallel to each other. In a preferred embodiment, said strip has been twisted around itself at 60 to 75 revolutions (first rotational direction A). Two of these prepreg strips twisted in this way have then been gathered and twisted together, now however at 40 to 50 revolutions in the opposite rotational direction B. Bits of 30 mm in length have subsequently been cut from the bundle thus obtained, and four of said bits of 30 mm have been arranged in a ball game racket frame at about 5.00 o'clock and 7.00 o'clock above and below the stringing plane, respectively. In comparison to analogously produced rackets without twisted multi-fiber rovings, test players have been describing the playing feel of the tennis racket produced in this way to be comfortably softened.

The invention claimed is:

1. A ball game racket frame with a head portion and a handle portion, wherein the ball game racket frame comprises a fiber composite with at least one multi-fiber roving that is at least partially twisted; and
wherein the twisted multi-fiber roving in the head portion is arranged to run through a cross section of the frame portion above and/or below a stringing plane, wherein the cross section is located at a first position on the frame portion and is perpendicular to a contour line of the frame portion at the first position.

2. The ball game racket frame according to claim 1, wherein the multi-fiber roving comprises one or a combination of the following fibers: carbon fibers, glass fibers, aramid fibers, basalt fibers, fibers of highly stretched polymers, steel fibers.

3. The ball game racket frame according to claim 2, wherein the aramid fibers include Kevlar or Technora.

4. The ball game racket frame according to claim 2, wherein the fibers of highly stretched polymers include polyethylene or polypropylene.

5. The ball game racket frame according to claim 1, wherein the frame comprises a frame portion in which it is applicable for every cross section through the frame portion perpendicular to its contour line that the share by area of the multi-fiber roving in the total area of the fiber composite is at least 1%.

6. The ball game racket frame according to claim 1, wherein the frame comprises a frame portion in which it is applicable for every cross section through the frame portion perpendicular to its contour line that the share by number of the twisted fibers of the multi-fiber roving in the total number of fibers of the fiber composite is at least 1%.

7. The ball game racket frame according to claim 1, wherein the number of twists n of the twisted multi-fiber roving per length l of the multi-fiber roving defines a ratio n/l, and wherein the ratio n/l is at least $0.2$ $cm^{-1}$.

8. The ball game racket frame according to claim 1, wherein the twisted multi-fiber roving comprises 3,000 to 100,000 fibers.

9. The ball game racket frame according to claim 1, wherein the twisted multi-fiber roving is embedded in a cured resin.

10. The ball game racket frame according to claim 1, wherein only one or a plurality of frame portions of the ball game racket frame is/are formed from the fiber composite with the twisted multi-fiber roving, and wherein the remaining ball game racket frame is formed from a fiber composite without twisted multi-fiber rovings.

11. The ball game racket frame according to claim 10, wherein the frame portion(s) is/are arranged in one or more of the following areas at the head portion: between 4:30 o'clock and 5:30 o'clock, between 6:30 o'clock and 7:30 o'clock, between 10:30 o'clock and 11:30 o'clock, between 12:30 o'clock and 1:30 o'clock.

12. A ball game racket frame with a head portion and a handle portion, wherein the ball game racket frame comprises a fiber composite with a plurality of multi-fiber rovings that are at least partially twisted;
wherein at least one of the plurality of multi-fiber rovings is arranged to run through a cross section of the frame portion above and/or below a stringing plane, wherein the cross section is located at a first position on the frame portion and is perpendicular to a contour line of the frame portion at the first position;
wherein the number of twists n of the twisted multi-fiber roving per length l of the multi-fiber roving defines a ratio n/l, and wherein the ratio n/l is at least $0.2$ $cm^{-1}$; and
wherein each of the plurality of multi-fiber rovings are arranged in the following areas of the head portion: between 4:30 o'clock and 5:30 o'clock, between 6:30 o'clock and 7:30 o'clock, between 10:30 o'clock and 11:30 o'clock, between 12:30 o'clock and 1:30 o'clock.

13. A method for producing a ball game racket frame, the method comprising:
providing a plurality of prepreg layers with pre-impregnated fibers, wherein at least one of the prepreg layers comprises a multi-fiber roving that is at least partially twisted;
inserting a tube made of prepreg layers into a racket mold; and
curing the prepreg layers within the racket mold using pressure and heat;
wherein the twisted multi-fiber roving in the head portion is arranged to run through a cross section of the frame portion above and/or below a stringing plane, wherein the cross section is located at a first position on the frame portion and is perpendicular to a contour line of the frame portion at the first position.

14. The method according to claim 13, wherein the step of providing the at least one prepreg layer comprising a twisted multi-layer roving comprises the following steps:
providing a fiber bundle with a plurality of fibers;
twisting the fiber bundle; and
inserting the twisted fiber bundle into a prepreg layer.

15. The method according to claim 13, wherein the step of providing the at least one prepreg layer comprising a twisted multi-layer roving comprises the following steps:
providing a fiber bundle with a plurality of fibers;
inserting the fiber bundle into a prepreg layer; and
twisting the prepreg layer inclusive of the fiber bundle.

16. The method according to claim 15, wherein the step of providing the at least one prepreg layer comprising a twisted multi-layer roving further comprises:
providing at least two twisted prepreg layers, wherein each of the two prepreg layers is twisted with a first rotational direction;
twisting together the at least two twisted prepreg layers, wherein the step of twisting together preferably takes place around a second, opposite rotational direction.

17. The method according to claim 16, wherein the number of twists n of the two twisted prepreg layers per length l of the layer defines a ratio n/l, and wherein the first ratio n/l is at least 0.2 cm-1.

18. The method according to claim 16, wherein the number of twists m of the prepreg layers with each other per length l of the layers defines a second ratio m/l, and wherein the second ratio m/l is smaller than the first ratio n/l.

19. The method according to claim 16, wherein the number of twists m of the prepreg layers with each other per length l of the layers defines a second ratio m/l, and wherein the second ratio m/l is at least $0.1 \text{ cm}^{-1}$.

20. The method according to claim 13, wherein the at least one prepreg layer defines a first longitudinal axis, and the alignment of the multi-fiber roving defines a second longitudinal axis, and wherein the first longitudinal axis and the second longitudinal axis enclose an angle α that lies within a range of between 5° and 85°.

\* \* \* \* \*